United States Patent
Pietroski

[15] 3,678,551

[45] July 25, 1972

[54] BLENDING DEVICE

[72] Inventor: Alex J. Pietroski, Madison Heights, Mich.

[73] Assignee: General Motors Corporation, Detroit, Mich.

[22] Filed: March 30, 1970

[21] Appl. No.: 23,790

[52] U.S. Cl. .................................................. 29/78
[51] Int. Cl. ............................................. B23d 71/00
[58] Field of Search ........................... 29/78, 79, 567

[56] References Cited

UNITED STATES PATENTS

| | | | |
|---|---|---|---|
| 3,008,217 | 11/1961 | Hall | 29/79 |
| 2,680,898 | 6/1954 | Didsi, Sr. | 20/78 X |
| 2,810,190 | 10/1957 | Schmidgall | 29/78 |
| 2,703,119 | 3/1955 | Pullen | 29/78 |

FOREIGN PATENTS OR APPLICATIONS

| | | | |
|---|---|---|---|
| 93,450 | 3/1959 | Norway | 29/78 |
| 853,805 | 11/1960 | Great Britain | 29/78 |
| 841,183 | 7/1960 | Great Britain | 29/78 |
| 1,207,352 | 8/1959 | France | 29/78 |
| 217,086 | 6/1924 | Great Britain | 29/78 |

*Primary Examiner*—Harrison L. Hinson
*Attorney*—William S. Pettigrew and Robert J. Wallace

[57] ABSTRACT

A blending device for soft filler material including a support member with a plurality of continuous cutting edges thereon. One form of the device includes a harder member with a hemispherical portion having a plurality of continuous cutting edges thereon formed by the intersection of a plurality of openings through the member. The hemispherical portion of the member minimizes ditching or edge cutting in the surface being worked on.

2 Claims, 4 Drawing Figures

PATENTED JUL 25 1972 3,678,551

INVENTOR.
Alex J. Pietroski
BY
R. J. Wallace
ATTORNEY

BLENDING DEVICE

This invention relates to an improved blending device, and more particularly to a blending device for blending arcuate surfaces without scraping, ditching or edge cutting therein.

One method of joining a plurality of body members to form a smooth continuous member includes coating the intersection therebetween and the area adjacent thereto with a soft metallic filler material such as solder. The excess filler can then be removed, and the filled area smoothly polished forming a smooth continuous surface. This polishing and filler removal is herein referred to as blending. It is also generally desirable to remove the filler material in large enough chips to avoid creating a dust-like atmosphere of the filler particles.

When the surface adjacent the intersection of the joined members is arcuate, a high degree of care must ordinarily be exercised to avoid ditching or scraping this surface. This is particularly true when this surface is concave. However, on a continuous assembly line, each blending operation may have to be performed in a few minutes. One way of avoiding excessive damage to the surface of the joined members is to use cutter material which is softer than the joined members. However, it is often economically desirable that the cutter material be selected for prolonged life, which normally dictates a hard cutter material.

Another method of minimizing scraping or ditching by a blending device includes using a resilient support member for the cutters. However, if too much filler material is applied to the intersection, as can often happen particularly when the filler is manually applied, a relatively thick layer of filler material can form on the surface. Blades on a rigid cutter support can generally remove the filler more efficiently in the thicker layers.

It is therefore an object of this invention to provide a blending device in which a hard cutter material may be used yet edge cutting or ditching can be avoided without a high degree of care.

Another object of this invention is to provide a blending device for arcuate surfaces in which a rigid cutter support may be used without edge cutting or scraping the surface adjacent the intersection of the joined members.

These and other objects are generally accomplished by a blending device which includes a member with a substantially hemispherical portion having a generally convex surface and a plurality of openings therethrough. A plurality of cutting edges are formed at the intersection of the openings and the convex surface. The cutting edges so provided have a convex profile which reduces edge cutting and scraping of the surface adjacent the intersection of the joined members.

Other objects, features and advantages of this invention will become more apparent from the following description of the preferred example and from the drawings in which.

Figure 1:
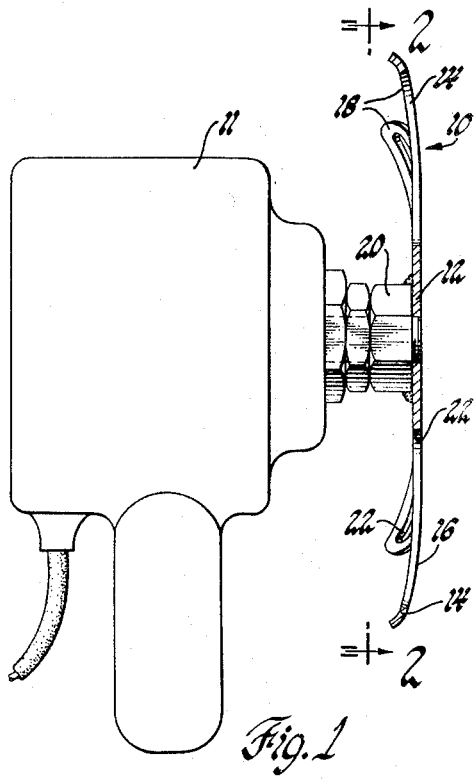
FIG. 1 is an edge view of a blending device made in accordance with this invention.
Figure 2:
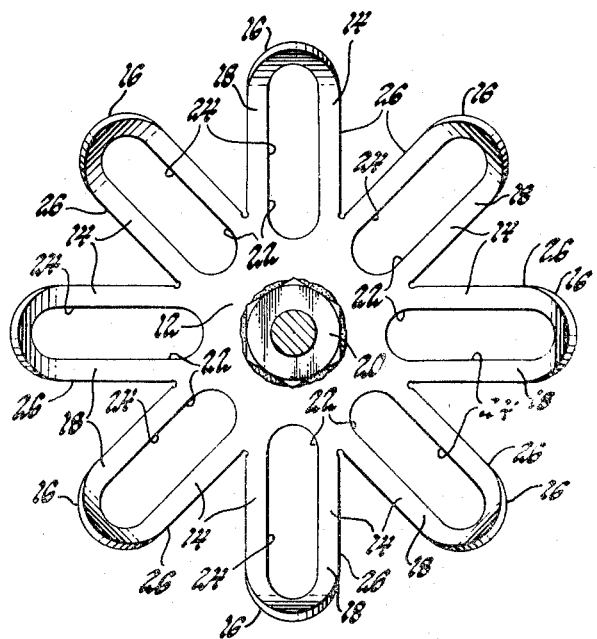
FIG. 2 is a partially broken away plan view of the device of FIG. 1.

Referring now to FIGS. 1 and 2, they show one embodiment of this invention including a steel support member 10, in the form of a rosette-like design, rotatably attached to a threaded shaft of a conventional air operated motor 11. The axis of rotation of the shaft, not shown, coincides with the center of the rotatable member. Member 10 includes a flat central portion 12. Eight finger-like arcuate appendage portions 14, which are hemispherical in shape, extend radially from central portion 12. Each appendage portion 14 is contiguous to an adjacent appendage and each has a large radius of curvature. As a consequence, each appendage portion 14 has a front convex surface 16 forming a convex working surface on the member and a back concave surface 18. The peripheral edge of each appendage portion abuts an edge of an adjacent appendage portion generally defining the periphery of member 10.

The steel support member is threadably secured to the shaft of the air motor by a rigidly depending nut 20 which is welded to the flat central portion on the back surface of the member. This feature facilitates rapid removal and replacement of the steel member when used under assembly line conditions.

As is best seen in FIG. 2, each appendage portion 14 contains a slot or oval-like opening 22 therethrough. The axial centerline, not shown, of each slot intersects convex surface 16 of each appendage portion generally at right angles forming a plurality of noncontiguous continuous cutting edges 24. A continuous cutting edge is also provided by the peripheral edges 26 of each appendage portion.

Referring now to certain dimensions and relationships of member 10, its planar diameter, or diameter in plan view, is about 6.0 inches. The diameter of flat central portion 12 is about 1.5 inches, while each appendage portion 14 has an arcuate length of about 2.5 inches. The width of each appendage portion 14 is about 1 inch across its innermost portion, adjacent the flat central portion, while it terminates in a semicircular-like outermost portion. The radius of curvature of each finger-like appendage portion is about 15 inches, which is about 2.5 times the planar diameter of the member. Accordingly, the outermost extremity of surface 18 is spaced about 0.2 inches from the plane of the surface of the flat portion.

Continuing with certain dimensions of member 10, it has a thickness of about 0.0625 inches. Corresponding parts of each appendage portion are angularly spaced about 45° from each other. Each slot 22 has a maximum longitudinal length of about 2.0 inches, while its maximum transverse width is about 0.625 inches. Accordingly, the diameter of an imaginary circle, not shown, transcribed by the rotation of the member is about 3.0 times the length of each slot, and about 9.5 times its maximum width.

Member 10 can be rotated either in a clockwise or counterclockwise direction to perform the blending operation. In either case, leading peripheral edges 26 of each appendage portion 14 and the trailing portion of each edge 24, with respect to the direction of rotation, will be the effective cutting edges. Each such cutting edge, all of which have an arcuate end portion, will successively engage the filled region as the member is rotated. Therefore, member 10 effectively provides about 16 noncontiguous cutting edges per direction of rotation. Each of the cutting edges has a substantially convex profile. That is, the plane of the innermost cutting edge portions are spaced from the plane of the outermost cutting edge portions. The cutting edges, as described, are sufficient to remove the softer filler material in chip form and concurrently polish the filled region when the member is rotated at about 3,000 rpm.

Figure 3:
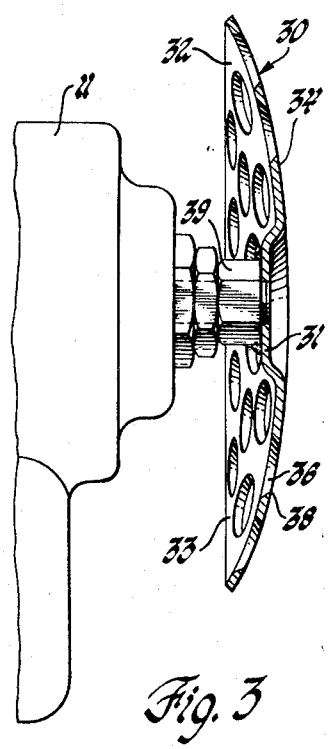
FIG. 3 is an edge view of a second blending device made in accordance with this invention.
Figure 4:
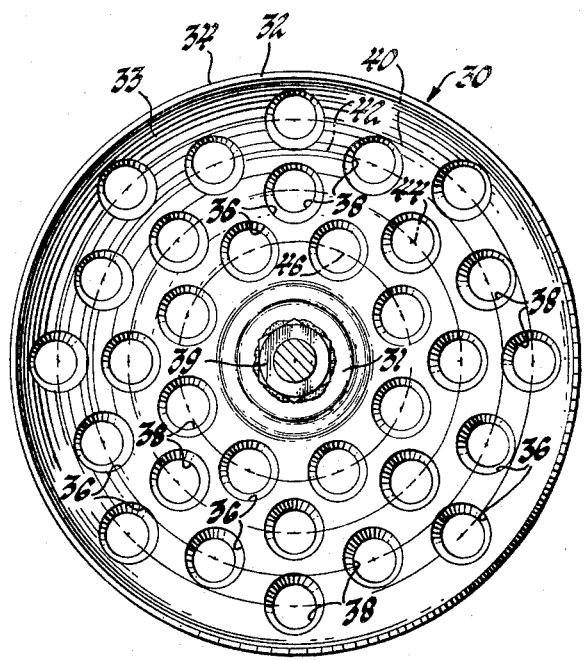
FIG. 4 is a partially broken away plan view of the device of FIG. 3.

Referring now to another embodiment of this invention, FIGS. 3 and 4 show a steel plate member 30 rotatably attached to the threaded shaft of the air motor 11. The axis of rotation of the shaft, not shown, also coincides with the center of member 30. The plate, which in plan view has the form of a circular disc, has a flat recessed central portion 31 and a hemispherical portion 32 surrounding portion 31. Hemispherical portion 32 has a concave back surface 33 and a front convex, or working surface 34. Member 30 also has about 32 circular openings 36 therethrough extending from adjacent central portion 31 to adjacent its periphery. Each of the openings has an axial centerline, not shown, which intersects convex surface 34 generally at right angles and provides noncontiguous cutting edges 38 thereon. However, the sides of the openings are slightly tapered, the diameter of the opening on back surface 33 being about 30 percent smaller than the diameter on the working surface. A threaded nut 39 is welded to central portion 31 adjacent concave surface 33 and securely mates with the threaded shaft of the air motor.

Referring now to certain relationships of member 30, the radius of curvature of each circular opening 36 is several times smaller than the radius of curvature of member 30 in plan view. On the other hand, the radius of curvature of the hemispherical portion of member 30 is several times larger than its diameter in plan view. Specifying now certain dimensions of the plate member, it has a planar diameter of about 6.0 inches and the hemispherical portion has a radius of curvature of about 15 inches, which is about 2.5 times its planar diameter. Accordingly, the plane of the periphery of the convex surface of the plate member is spaced about 0.3 inches from its plane adjacent the central portion. The diameter of each circular opening is about 0.625 inches on working surface 34. Therefore, the planar diameter of member 30 is about 9.5 times the diameter of each opening 36.

Circular openings 36 are generally uniformly arrayed around member 30 in four sets each having eight openings. The four sets of openings have their axial centerlines located at radii of about 2.5, 2.185, 1.75 and 1.25 inches, respectively, from the center of the plate. These radii are indicated by imaginary circular lines 40, 42, 44 and 46, respectively, from the outermost radius to the innermost radius. The circular openings having their centerlines located on lines 40 and 44 are angularly aligned; while the openings having their centerlines located on lines 42 and 46 are angularly aligned. Each opening has its centerline uniformly spaced about 45° from an adjacent centerline of an opening in the same set. Radially adjacent sets have adjacent openings with centerlines spaced about 22.5° apart.

This embodiment may also be rotated in also a clockwise or counterclockwise direction with equal effectiveness. In either case, essentially the trailing semicircular portion of each circular cutting edge 38 will be the effective cutting edges. Accordingly, in this embodiment effectively, about 32 semicircular-like cutting edges per direction of rotation are provided which is sufficient to remove the filler material in chip form and concurrently polish the filled region.

It should be pointed out that while steel has been used for the herein described embodiments other hard materials may be used. However, a steel member has been found to have prolonged usefulness and is preferred.

Describing now the operation of the embodiments of this invention, the substantially hemispherical portion of the support member normally engages a filled region with its axis of rotation about perpendicular to the underlying surface. Therefore, the innermost cutting edges will generally engage the filled surface, while the outermost edges will be generally spaced therefrom substantially minimizing edge cutting. Moreover, even if the member is slightly tilted from the normal position as it engages a surface the periphery of the member is still generally spaced from the surface. Further, the substantially hemispherical profile of the member also substantially prevents scraping of the surface adjacent to the filled regions. In fact, even when the surface adjacent the intersection of the joined member is slightly concaved, the periphery of the blending member generally avoids ditching or edge cutting therein.

It should be mentioned that good results are generally obtained when the radius of curvature of the hemispherical portion is such so as to space the plane of its periphery from the plane of its center portion at least about 0.2 inches. However, this curvature should be large enough to allow a substantial portion of the cutting surface to engage the filled region. Good results are generally obtained when the axial radius of curvature is about 1–5 times the planar diameter of the member, particularly when the planar diameter is about 4–16 inches. A planar diameter of less than about 4 inches can be inefficient, particularly with an axial radius of curvature of only about 4 inches. In contrast, a planar diameter of more than about 16 inches is cumbersome to use.

What is claimed is as follows:

1. A rotary blending device for removing excess soft metallic filler in chip form from a region having a surface while concurrently polishing the filler on the surface of the region, which device comprises a generally rosette-like member of harder metal with a planar diameter of about 4–16 inches, a generally flat central portion adapted for attachment to a rotating means, a plurality of substantially hemispherical contiguous appendage portions on said member surrounding said central portion and extending generally radially therefrom forming a substantially convex working surface, the radius of curvature of said working surface being about 1–5 times the planar diameter of said member, the peripheral edge of each of said plurality of appendage portions providing a continuous peripheral cutting edge on said convex surface, each of said appendage portions having an oval-like opening therethrough, each of said openings intersecting said convex working surface providing a plurality of noncontiguous oval-like continuous cutting edges on said working surface, each of said cutting edges extending from adjacent the flat central portion to adjacent the periphery of said member providing a generally convex profile which minimizes ditching or scraping of the surface being worked on.

2. A rotary blending device for removing excess soft solder filler in chip form from a region having a surface while concurrently polishing the filler on the surface of the region, which device comprises a generally rosette-like steel member with a planar diameter of about 6 inches, a generally flat central portion on said member, about eight substantially hemispherical contiguous appendage portions on said member surrounding said central portion and extending generally radially therefrom forming a substantially convex working surface, the radius of curvature of said working surface being about 2.5 times the planar diameter of said member, the peripheral edge of each of said appendage portions providing a continuous peripheral cutting edge on said convex surface, each of said appendage portions having an oval-like opening therethrough, each of said openings intersecting said convex working surface providing noncontiguous oval-like continuous cutting edges on said working surface, each of said cutting edges extending from adjacent the flat central portion to adjacent the periphery of said member, the plane of the cutting edges on said working surface adjacent the flat central portion being spaced from the plane of the cutting edges adjacent the periphery at least about 0.2 inches providing a generally convex profile which minimizes ditching or scraping of the surface being worked on.

* * * * *